United States Patent
Gada et al.

(10) Patent No.: US 10,747,298 B2
(45) Date of Patent: Aug. 18, 2020

(54) DYNAMIC INTERRUPT RATE CONTROL IN COMPUTING SYSTEM

(71) Applicant: Advanced Micro Devices, Inc., Santa Clara, CA (US)

(72) Inventors: Sridhar V. Gada, Banagalore (IN); Alexander J. Branover, Chestnut Hill, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 153 days.

(21) Appl. No.: 15/899,157

(22) Filed: Feb. 19, 2018

(65) Prior Publication Data

US 2019/0163251 A1    May 30, 2019

(30) Foreign Application Priority Data

Nov. 29, 2017   (IN) .............................. 201711042849

(51) Int. Cl.
| | |
|---|---|
| *G06F 1/329* | (2019.01) |
| *G06F 9/50* | (2006.01) |
| *G06F 9/48* | (2006.01) |

(52) U.S. Cl.
CPC ............ *G06F 1/329* (2013.01); *G06F 9/4812* (2013.01); *G06F 9/5027* (2013.01); *G06F 9/5094* (2013.01)

(58) Field of Classification Search
CPC ...................................................... G06F 1/32
See application file for complete search history.

(56) References Cited

U.S. PATENT DOCUMENTS

| | | |
|---|---|---|
| 5,303,362 A | 4/1994 | Butts, Jr. et al. |
| 5,412,788 A | 5/1995 | Collins et al. |

(Continued)

FOREIGN PATENT DOCUMENTS

| | | |
|---|---|---|
| EP | 2490100 B1 | 10/2014 |
| WO | 2014209395 A1 | 12/2014 |
| WO | 2015143594 A1 | 10/2015 |

OTHER PUBLICATIONS

International Search Report and Written Opinion in International Application No. PCT/US2018/053116, dated Jan. 30, 2019, 12 pages.

(Continued)

*Primary Examiner* — Kim Huynh
*Assistant Examiner* — Joshua Neveln
(74) *Attorney, Agent, or Firm* — Kowert Hood Munyon Rankin and Goetzel PC; Rory D. Rankin (57) ABSTRACT

Systems, apparatuses, and methods for intentionally delaying servicing of interrupts in a computing system are disclosed. A computing system includes a processor that services interrupts generated by components of the computing system. An interrupt controller detects a received interrupt and intentionally delays servicing of the interrupt depending on various conditions. If the interrupt is a first type of interrupt and the processor is in a first power state, servicing of the interrupt is delayed by a first period of time. If the interrupt corresponds to the first type of interrupt and the processor is in a second power state, servicing of the interrupt is delayed for a period of time that is longer than the first period of time. If a non-maskable interrupt is received before expiration of either the first or second period of time, then servicing of any previously delayed interrupts is allowed to proceed.

20 Claims, 5 Drawing Sheets

(56) References Cited

U.S. PATENT DOCUMENTS

| | | |
|---|---|---|
| 5,517,494 A | 5/1996 | Green |
| 5,537,575 A | 7/1996 | Foley et al. |
| 5,560,038 A | 9/1996 | Haddock |
| 5,659,708 A | 8/1997 | Arimilli et al. |
| 5,673,413 A | 9/1997 | Deshpande et al. |
| 5,684,977 A | 11/1997 | Van Loo et al. |
| 5,749,095 A | 5/1998 | Hagersten |
| 5,859,983 A | 1/1999 | Heller et al. |
| 5,878,268 A | 3/1999 | Hagersten |
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |
| 5,987,544 A | 11/1999 | Bannon et al. |
| 5,991,819 A | 11/1999 | Young |
| 6,012,127 A | 1/2000 | McDonald et al. |
| 6,018,791 A | 1/2000 | Arimilli et al. |
| 6,038,644 A | 3/2000 | Irie et al. |
| 6,049,851 A | 4/2000 | Bryg et al. |
| 6,070,231 A | 5/2000 | Ottinger |
| 6,085,263 A | 7/2000 | Sharma et al. |
| 6,098,115 A | 8/2000 | Eberhard et al. |
| 6,101,420 A | 8/2000 | VanDoren et al. |
| 6,108,737 A | 8/2000 | Sharma et al. |
| 6,108,752 A | 8/2000 | VanDoren et al. |
| 6,112,281 A | 8/2000 | Bamford et al. |
| 6,138,218 A | 10/2000 | Arimilli et al. |
| 6,199,153 B1 | 3/2001 | Razdan et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,286,090 B1 | 9/2001 | Steely, Jr. et al. |
| 6,292,705 B1 | 9/2001 | Wang et al. |
| 6,295,583 B1 | 9/2001 | Razdan et al. |
| 6,370,621 B1 | 4/2002 | Keller |
| 6,631,401 B1 | 10/2003 | Keller et al. |
| 8,234,429 B2 | 7/2012 | Serebrin |
| 8,234,432 B2 | 7/2012 | Serebrin |
| 2002/0083254 A1 | 6/2002 | Hummel et al. |
| 2008/0222389 A1 | 9/2008 | Bruce et al. |
| 2012/0047402 A1* | 2/2012 | Chen ................ G06F 1/3287 714/38.13 |
| 2012/0210104 A1* | 8/2012 | Danko ............ G06F 9/30076 712/229 |
| 2013/0080673 A1 | 3/2013 | Feehrer et al. |
| 2014/0156950 A1 | 6/2014 | Chew |
| 2015/0212564 A1* | 7/2015 | Min .................. G06F 13/24 713/320 |
| 2016/0117247 A1 | 4/2016 | Morton et al. |
| 2017/0161096 A1* | 6/2017 | Loh .................. G06F 13/24 |

OTHER PUBLICATIONS

International Search Report and Written Opinion in International Application No. PCT/US2019/039288, dated Oct. 4, 2019, 11 pages.

Kalyanasundharam et al., U.S. Appl. No. 16/112,367, entitled "Probe Interrupt Delivery", filed Aug. 24, 2018, 27 pages.

* cited by examiner

| System State 302 | Interrupt Mode 304 | Masking Timer 306 | Maskable Interrupts 308 |
|---|---|---|---|
| Active | Interrupt Mode 0 | Masking Off | None |
| Idle S1 | Interrupt Mode 1 | Masking On : Duration T = N | Type A, Type B |
| Idle S2 | Interrupt Mode 2 | Masking On : Duration T = M > N | Type A, Type B, Type C, Type D |
| Idle S3 | Interrupt Mode 3 | Masking On until Wake | Type A, Type B, Type C, Type D |

DYNAMIC INTERRUPT RATE CONTROL IN COMPUTING SYSTEM

PRIORITY INFORMATION

This application claims benefit of priority to Indian Application No. 201711042849, entitled "Dynamic Interrupt Rate Control In Computing Systems", filed, Nov. 29, 2017, the entirety of which is incorporated herein by reference.

BACKGROUND

Description of the Relevant Art

Modern processors include a variety of circuits and components to facilitate fast and efficient computation. In addition, circuits and components are included to manage communications between devices, including devices external to the processor. For example, input/output (I/O) controllers are generally included to manage communications with external devices such as display devices, external storage devices, network communications, as well as various other peripheral devices. In order to communicate with these devices, transactions are conveyed from, and received by, processing elements of the processor (e.g., central processing units, graphics processing units, etc.).

In recent years, greater effort has been put into reducing the power consumed by computing devices. In the case of battery operated computing devices, reducing power consumption can mean longer operating times before the battery must be recharged. In other cases, reducing power consumption may serve other purposes—such as reducing the operating temperature of a device or seeking to be more environmentally friendly. Whatever the reason, one of the drawbacks of reducing power consumption is that the performance of the device is typically reduced as well. If the performance of a device (e.g., a laptop, mobile phone, gaming console, etc.) is noticeably degraded due to mechanisms within the device to reduce power consumption, users become frustrated and dissatisfied with the device. As a consequence, users may not purchase the device.

In order to provide products that meet user's performance expectations, designers must balance power consumption concerns with performance issues. To this end, designers must determine when, and to what degree, a device can enter a reduced power state. One important component in the management of power consumption in a computing system is the time that a processing unit (such as a central processing unit, CPU) is in an idle state. Because CPUs consume relatively significant amounts of power when not idle, keeping the CPU in an idle state for longer periods of time can reduce power consumption. One activity that interferes with the idle state of a CPU is the handling of interrupts. Interrupts occur in response to activity detected by the system (e.g., I/O). For example, if a user activates an input device, such as a mouse, the activity is detected and an interrupt is generated. An interrupt handler then "interrupts" the CPU to let it know that activity has been detected that must be handled. In response to the interrupt, the CPU takes an action to respond to the activity—such as by causing a mouse pointer to move to a location on a display device, etc. When handling such interrupts, the CPU must exit an idle state (if it was in an idle state) to enter a higher power-performance state (power state). This higher power-performance state consumes more power than the idle state. When interrupts are handled as they come in, the CPU may be caused to enter and exit an idle state repeatedly which in turn reduces the effectiveness of the idle state on reducing power consumption.

While the immediate handling of interrupts as described above provides for improved performance, it increases power consumption. While this may be the most straightforward way of ensuring the performance of a device remains high, in some cases the immediate handling of interrupts may not be necessary for maintaining a satisfying user experience. In view of the above, system and methods are desired for enabling more efficient power management are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for masking and unmasking interrupts in a computing system are disclosed herein. Interrupts that are masked have their servicing intentionally delayed and are coalesced for a period of time during which they are not handled. At a later point in time, interrupts that have been coalesced are serviced.

Figure 1:
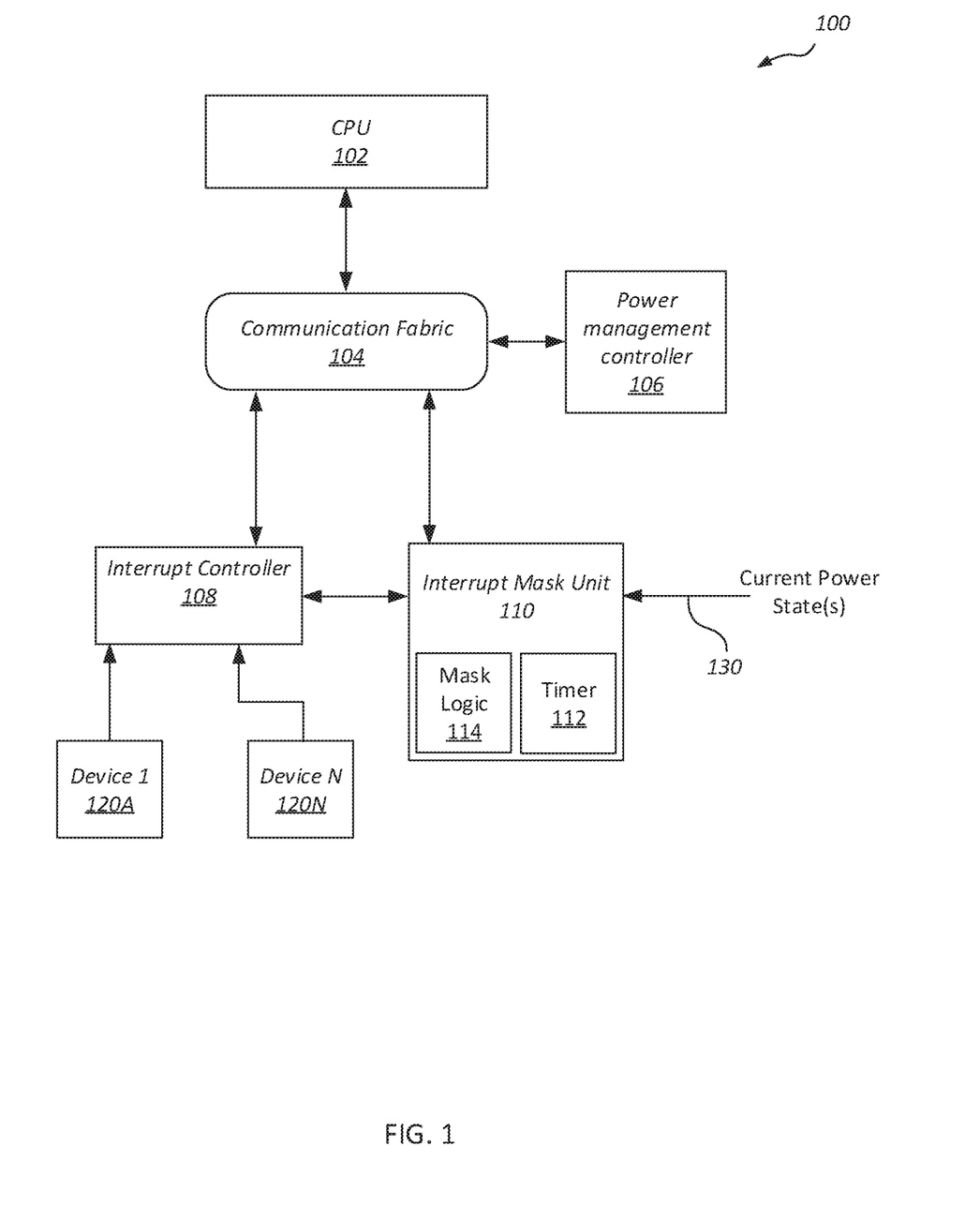
FIG. 1 is a block diagram of one embodiment of a computing system.

FIG. 1 illustrates one embodiment of a system 100 including an interrupt controller 108 that is used to detect and handle interrupts in the computing system. In the example shown, multiple external devices 120A-120N (e.g., mouse, camera, storage device, etc.) are coupled to convey a signal that is detected by the interrupt controller 108. In the example shown, a CPU 102 handles interrupts when notified by the interrupt controller 108 of a received interrupt(s). In various embodiments, interrupts can be generated by the CPU 102, any of devices 120, or other components in the system not explicitly illustrated.

In the embodiment shown, the CPU 102 is coupled to communicate with the interrupt controller 108 via a communication fabric 104. Communication fabric 104 is representative of any bus, crossbar, network, or other mechanism to convey data between the CPU 102 and the link controller 108. In various embodiments, the communication fabric 104 includes separate command and data paths. In other embodiments, a single path is used for conveyance of both commands and data.

Also shown in FIG. 1 is a power management controller 106. In the example shown, the power management controller 106 is coupled to other components in the system 100 via the communication fabric 104. However, as may be appreciated by those skilled in the art, logic represented by the power management controller 106 can be placed elsewhere in a computing system and can communicate with other components in the system via paths other than the communication fabric 104. Generally speaking, the power management controller 106 monitors and/or controls various power-performance states of components within the system 100. Responsive to detecting various events, the power management controller 106 causes other components within the system 100 to either increase or decrease its current power-performance state. Changing a power-performance state includes changing a current operating frequency of a component (e.g., CPU 102, fabric 104, etc.) and/or changing a current voltage level for a particular component.

In addition to the above, FIG. 1 includes an interrupt mask unit 110 with an interface for coupling to the interrupt controller 108 and an interface for receiving an indication of a current power state(s) 130 of the system. In various embodiments, the interrupt mask unit 110 provides an indication(s) to the interrupt controller 108 that indicates which received interrupts can be serviced in an intentionally delayed manner (i.e., which interrupts can be "masked"). In various embodiments, the determination as to which interrupts can be serviced in a delayed manner is based at least in part on the type of interrupt received and a current power-performance state 130 of one or more components within the system 100. While shown as a separate unit, mask unit 110 circuitry can be included as part of interrupt controller 108. In various embodiments, the circuitry of mask unit 110 is designed to perform the functions described herein. In other embodiments, the mask unit 110 includes circuitry that executes instructions to perform the described functions. In various embodiments, circuitry associated with the interrupt controller 108 and mask unit 110 remains powered even when other parts of the system are in an idle or reduced power state. Also shown in the embodiment of FIG. 1, a timer 112 and mask logic 114 are included in the interrupt mask unit 110. In various embodiments, the timer 112 is used to determine how long interrupts of various types will be intentionally delayed. In various embodiments, the mask logic 114 includes circuitry to determine a type of a received interrupt, set the timer 112 to various values based on a type of received interrupt and current power state 130, and determine if the timer 112 has expired or a non-maskable interrupt (i.e., an interrupt whose servicing cannot be intentionally delayed) has been received.

Figure 2:
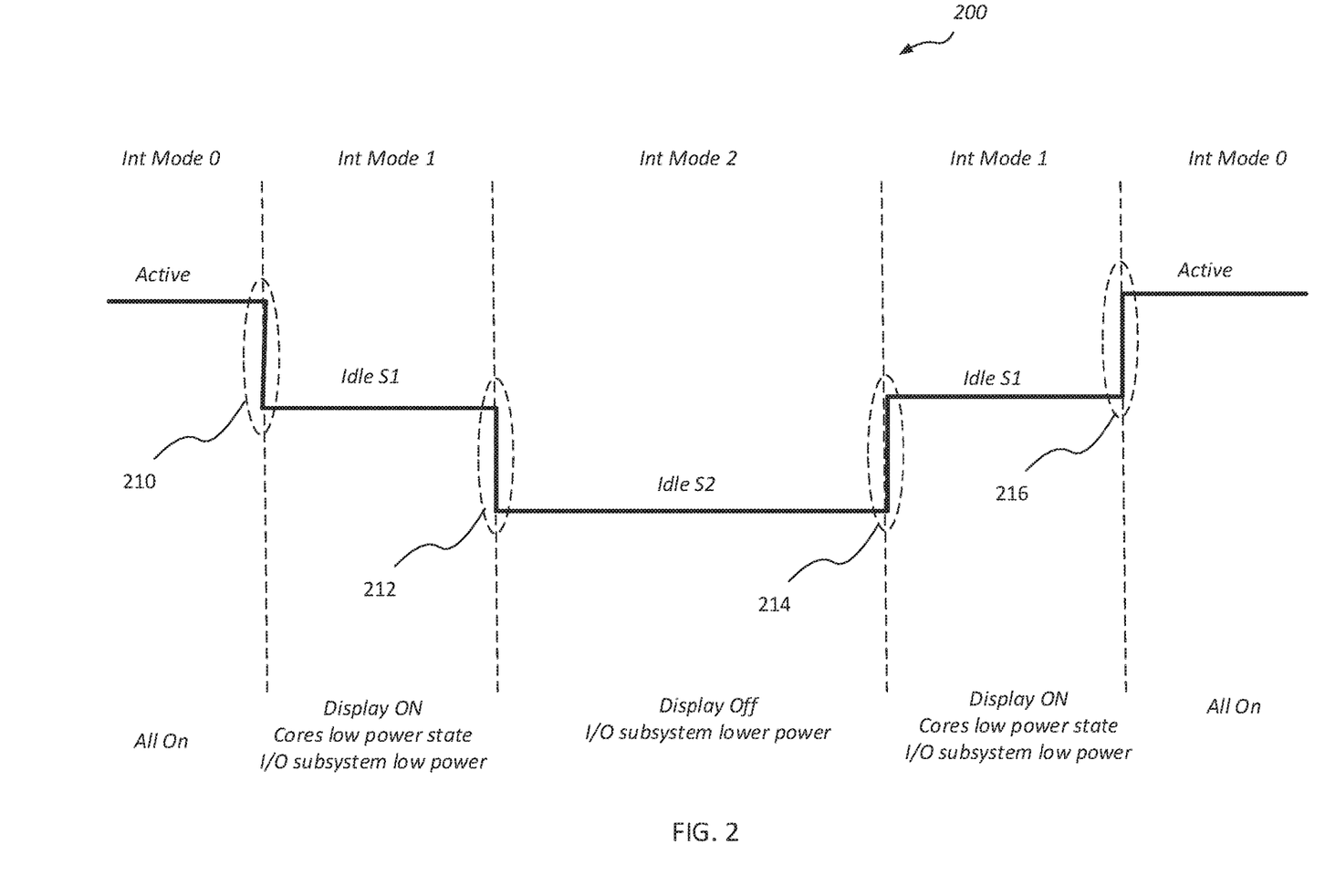
FIG. 2 illustrates power-performance state transitions and interrupt modes in a computing system.

FIG. 2 shows a diagram 200 illustrating various operating states for a component in a computing system, and corresponding interrupt modes (Int Mode 0, Int Mode 1, and Int Mode 2) that can be implemented. In the example shown, power-performance states of a component are shown to transition through various states. Generally speaking, a given power-performance state has a corresponding power level (e.g., as reflected by a particular voltage being supplied to the component). The power-performance level also includes a given performance associated with a given operating frequency. For purposes of discussion, a processor such as a CPU is the component. However, other components are possible and are contemplated.

As shown, three distinct power-performance levels are shown—Active, Idle S1, and Idle S2. While only three power-performance levels are shown, other embodiments can include more or fewer than three power-performance levels. Generally speaking, the "Active" level corresponds to a full power level and all components are on (All On). In other words, the component is not operating in a reduced power state. The "Idle S1" state represents a state in which the component is idle and has been idle for less than a threshold amount of time and is operating in a reduced power state. In this example, the display remains on, processor cores are in a low power state, and the I/O subsystem is in a low power state. The "Idle S2" state represents a state in which the component is idle and has been in an idle state for more than the threshold amount of time. While in the Idle S2 state the component is operating in a lower power state than when in the Idle S1 state. In this example, the display is turned off (Display Off) and the I/O subsystem is placed into an even lower power state.

FIG. 2 illustrates transitions (210, 212, 214, 216) between these power states. For example, when the component transitions 210 from the Active state to the Idle S1 state, the component and/or one or more other components can transition to a lower power-performance state than its current state. Similarly, a transition 212 from the Idle S1 state to the Idle S2 state results in an even lower power operating state. It is noted that while the example shows transitions between adjacent states (e.g., from Idle S1 to Idle S2), embodiments are contemplated in which a transition from one state to another can "jump" across one or more states to directly enter a non-adjacent state. For example, a transition directly from the Idle S2 state to the Active state can occur.

Associated with each of the power-performance states are different interrupt handling modes. As shown in FIG. 2, there is an interrupt mode 0 (Int Mode 0), interrupt mode 1 (Int Mode 1), and interrupt mode 2 (Int Mode 2). In various embodiments, the interrupt mode is determined at least in part on the current power-performance state. For example, when the system transitions from the Active state to the Idle S1 state, the interrupt mode transitions from Int Mode 0 to Int Mode 1.

Figure 3:
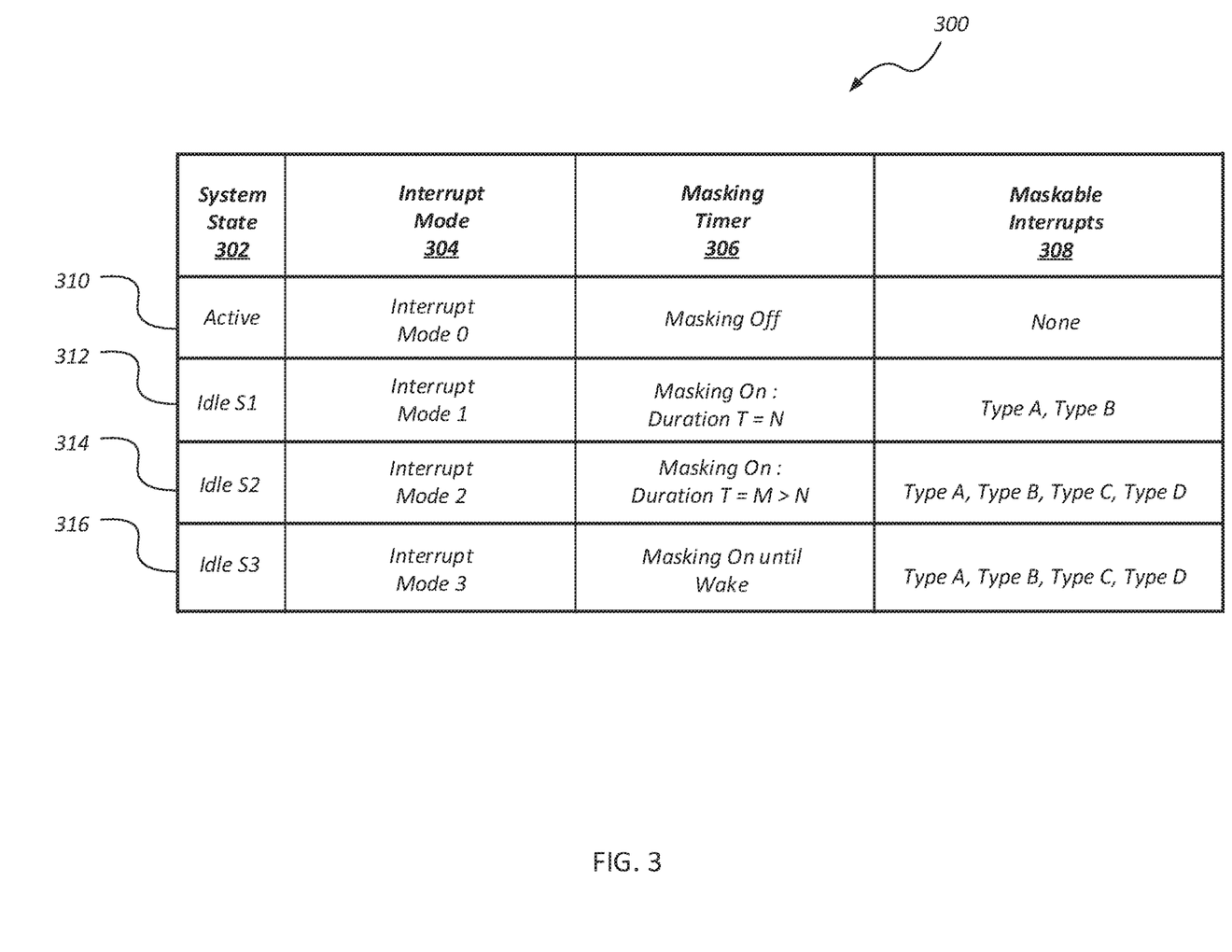
FIG. 3 is a table illustrating system states, interrupt modes, masking timer values, and maskable interrupts.

FIG. 3 provides a table 300 illustrating one embodiment of interrupt modes associated with system states. Table 300 includes four columns. The first column (System State 302) identifies a current power-performance state of the system as discussed above. The second column (Interrupt Mode 304) shows an interrupt mode associated with a corresponding system state. The third column (Masking Timer 306) indicates whether interrupt masking is on and identifies a masking duration T. In various embodiments, the masking timer is located within the interrupt mask unit 110 as shown in FIG. 1. However, in other embodiments the timer is located elsewhere. The fourth column (Maskable Interrupts 308) identifies which, if any, interrupts are maskable for the given mode. Generally speaking, a "maskable" interrupt is an interrupt whose servicing can be intentionally delayed under certain conditions. Whether an interrupt is maskable can be determined programmatically or otherwise as desired.

In FIG. 3, the first row 310 corresponds to an Active state of the system. When in an Active state, components within the system (e.g., the CPU) are operating in a manner in which received interrupts are handled without intentional delay. This is referred to as Interrupt Mode 0. In this mode, no interrupts are masked (Masking Off), and no interrupts are maskable (None). Servicing an interrupt without intentional delay does not mean there is no delay in servicing an interrupt. In various embodiments there are inherent delays in servicing interrupts. Intentional delay, as used herein, refers to an intentional addition of time that is added before servicing of an interrupt will begin. The second row 312 corresponds to an Idle S1 state. In various embodiments, the Idle S1 state corresponds to a state in which one or more components have been idle for some period of time, but not greater than a threshold amount of time. For example, if the CPU is currently idle and has been idle for N cycles (or some other measure of time) and N is less than some threshold amount of time, then the CPU is deemed to be in the Idle S1 state. While in an idle state, the CPU consumes less power than when in the Active state. In order to service an interrupt, the CPU must exit the idle state and enter the Active state. Therefore, power consumption increases when the CPU transitions from an idle state to the Active state to service an interrupt.

As shown by the table 300, while in the Idle S1 state, interrupt masking is enabled (Masking On) and a duration of time T is set equal to some value N. N can be a number of cycles, or any other desired measure of time. As masking is enabled, interrupts that can be masked (intentionally delayed) are identified. In the example shown, interrupts of type A and type B are maskable, where A and B are designations representing two types or categories of interrupts that can occur in the system. This means that if an interrupt of type A or type B would ordinarily occur, servicing of these interrupts can be delayed (or "coalesced"). In various embodiments, coalescing interrupts includes storing data indicative of the interrupt (e.g., interrupt type, device ID, etc.) in a queue or other storage structure. When an interrupt is coalesced in this manner, the CPU is not made aware of the interrupt. Consequently, the CPU remains in its current idle state instead of transitioning to an Active state.

When masking is enabled as in row 312, the duration of time T effectively sets a limit on how long interrupts can be intentionally delayed/coalesced. For example, in one embodiment, while in Interrupt Mode 1, the masking duration T is set to some value N representing a given amount of time. Assuming only maskable interrupts are received during such a period of time, the received interrupts will be coalesced until the expiration of the time period T. When the time period T expires, any interrupts that have been coalesced are serviced. Servicing the interrupts will cause the CPU to exit an idle state and enter an active state. In the event there are no other conditions present that would keep the CPU in the Active state, the CPU can reenter the idle state after servicing the interrupts. If a non-maskable interrupt occurs while masking is enabled, the received non-maskable interrupt will be serviced without being coalesced and without regard to the masking duration T. In various embodiments, when the non-maskable interrupt is serviced, any other interrupts that were coalesced are also serviced at this time. Non-maskable interrupts can include interrupts associated with a user presence detection device (e.g., a camera), USB I/O devices (e.g., a mouse, pen, touch pad, etc.), or otherwise.

Returning to table 300, row 314 corresponds to an Idle S2 state. While in the Idle S2 state, Interrupt Mode 2 is in effect. When in Interrupt Mode 2, masking is enabled and a masking duration T is set. In this case, the duration T is set to some value M, where M>N. In effect, when the power-performance state is lower (as it is for Idle S2 as compared to Idle S1), then masking can be used more aggressively. In addition to having a longer masking duration, more and/or different types of interrupts can be maskable. In this example, two additional types of interrupts have been identified as being maskable so that interrupts of Type A, Type B, Type C, and Type D are all maskable, where A, B, C and D are designations representing different types or categories of interrupts that can occur in the system. Similar to that discussed above, interrupts identified as maskable will be coalesced until expiration of the maskable duration. Upon expiration of this period time, any coalesced interrupts will be serviced. Also, as above, if a non-maskable interrupt is received it will be serviced without coalescing and any interrupts that were coalesced can also be serviced.

Row 316 corresponds to an even lower power-performance state (Idle S3). In this state, Interrupt Mode 3 is in effect and masking of maskable interrupts is performed without a particular duration being established. In this case, interrupts will be masked until a non-maskable interrupt is received.

Figure 4:
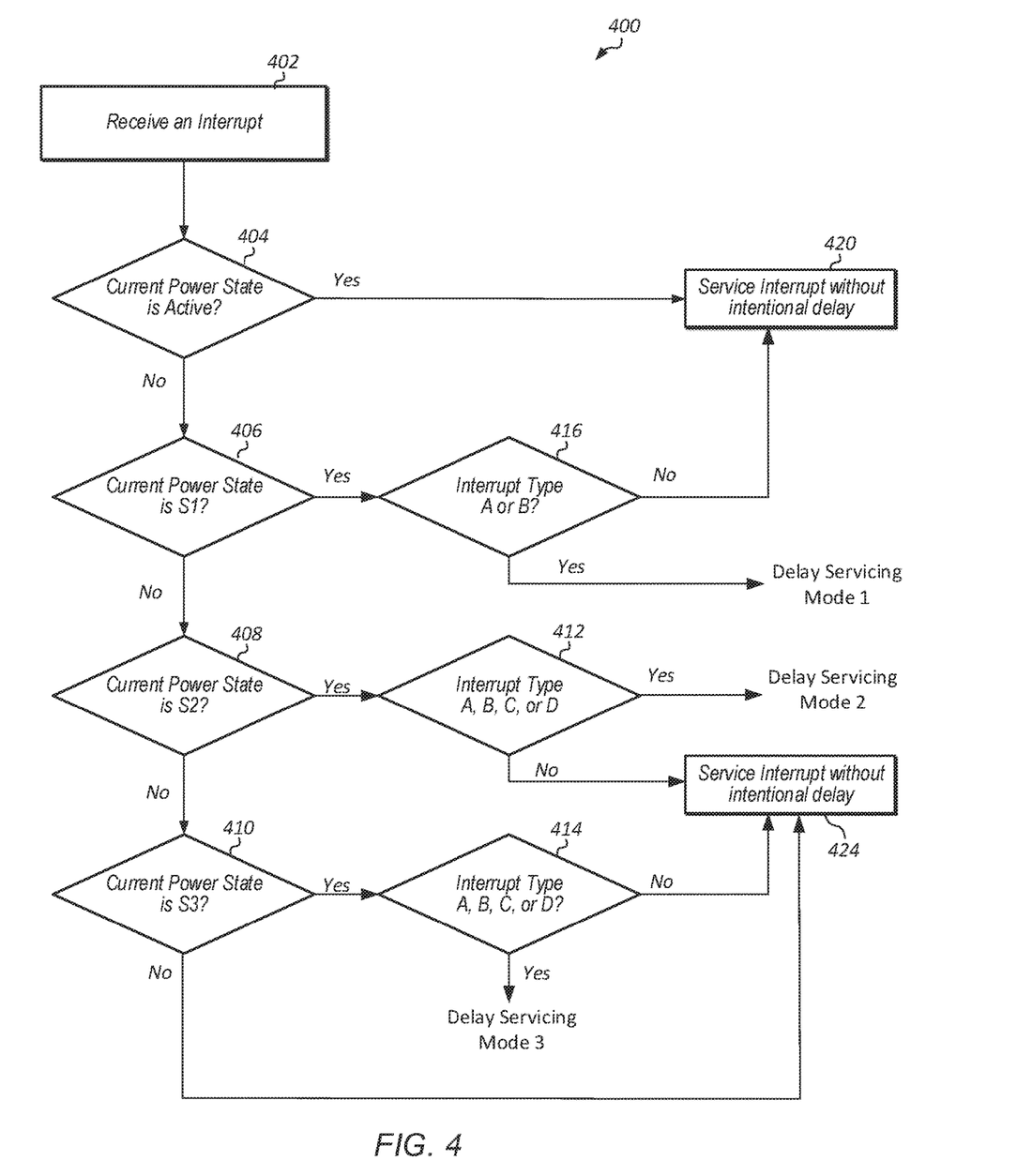
FIG. 4 is one embodiment of a method for managing interrupts in a computing system.

Turning now to FIG. 4, one embodiment of a method 400 for intentionally delaying the servicing of interrupts is illustrated. In the example shown, an interrupt is received 402 and a determination is made as to the current power state of the system (blocks 404, 406, 408, and 410). Depending on the current power state, various actions are taken. Generally speaking, the determination of a given power state in FIG. 4 can be used to determine a given interrupt mode. For example, a register or indication can be used to determine a current power state of the system. However, in other embodiments, as discussed in relation to FIG. 3, different power states are associated with different interrupt modes. Accordingly, rather than determining a current power state of the system as illustrated in FIG. 4 to determine an interrupt mode, other embodiments can directly determine a current interrupt mode by accessing a register value or otherwise.

As shown in FIG. 4, subsequent to receiving an interrupt, if the current power state of the system is Active (404), then servicing of the interrupt proceeds without the introduction of any intentional delays (420). As previously discussed, the Active state generally corresponds to a full power state. It is noted that in some embodiments, the Active state does not necessarily mean all system components are on or in a full power state. Rather, in some embodiments, the Active state corresponds to a state in which all components relevant to serving a particular interrupt are on and in a power state capable of servicing the interrupt, even if that is not the highest power state of the system or device. In addition to the above, it is noted that servicing an interrupt without the introduction of an intentional delay does not mean there is no delay in servicing the interrupt. On the contrary, best efforts in servicing an interrupt can entail various unavoidable delays. As used herein, an intentional delay is a delay that has been introduced that could have been avoided if desired. In other words, where servicing of an interrupt could have occurred within N cycles (or some other measure of time), the interrupt is not serviced for at least a period of time N+M, where M is an additional amount of time deliberately introduced for the purpose of delaying the servicing of the interrupt.

If the current power state is not the Active state (404), but is the power state S1 (406), then a determination is made as to whether the received interrupt corresponds to a particular type of interrupt (416). In various embodiments, power state S1 represents a power state that is lower than the Active state, but higher than other power states of the system. In the embodiment shown, the particular type of interrupt (416) is one of type A or B, where A and B are designations representing two types or categories of interrupts that can occur in the system. If the interrupt does not correspond to the designated type (A or B) (416), then the received interrupt is not currently maskable and the received interrupt is serviced without the introduction of any intentional delays (420). However, if the received interrupt does correspond to one of the designated types (416), the servicing of the interrupt is intentionally delayed according to a given delay mode (Mode 1). Further details of the handling of interrupts for various delay modes is discussed in relation to FIG. 5.

If the current power state is not S1 (406) but is state S2 (408), then a determination is made (412) as to whether the interrupt corresponds to at least one of multiple types including types A, B, C or D. In various embodiments, power state S2 represents a power state that is lower than the state S1, but higher than one or more other power states of the system. When in power state S2, more and/or different interrupt types can be deemed maskable. Hence, in the example shown, the categories have been expanded from types A and B (as shown in block 416) to also include types C and D (as shown in block 412). It is noted that while the discussion describes two types A and B in the first instance, and four types A, B, C, and D in the second instance, this is intended to be exemplary only. In various embodiments, any number of desired interrupts or types of interrupts can be included in each of the various groupings. For purposes of discussion, the designated types of interrupts in FIG. 4 has been chosen simply to reflect those illustrated in FIG. 3.

If in block 412 the received interrupt does not correspond to one of the types A, B, C, or D, then the received interrupt is serviced without the introduction of any intentional delays 424. However, if the received interrupt corresponds to one of the designated types 412, then servicing of the interrupt is intentionally delayed according to a given delay mode (Mode 2).

Finally, if the current power state is not S2 (block 408), but is state S3 (a power state lower than S2) (410), then a determination is made as to whether the received interrupt corresponds to one of multiple types 414. In the example shown, the types illustrated in block 414 are the same as those in block 412. However, this need not be the case. In other embodiments, the types in block 414 can include additional and/or other types. If the received interrupt does not correspond to one of the designated types, then the interrupt is serviced without the introduction of an intentional delay 424. However, if the received interrupt does correspond to one of the designated types, then the interrupt is serviced according to a delayed servicing mode—Mode 3. In the example of FIG. 4, S3 is illustrated as the lowest power state and generally corresponds to a sleep or other lower power state. However, other embodiments can include more and/or different power states than those illustrated. Such embodiments are possible and are contemplated. If the current power state does not correspond to S3 (410), then the interrupt is serviced without intentional delay (424).

Figure 5:
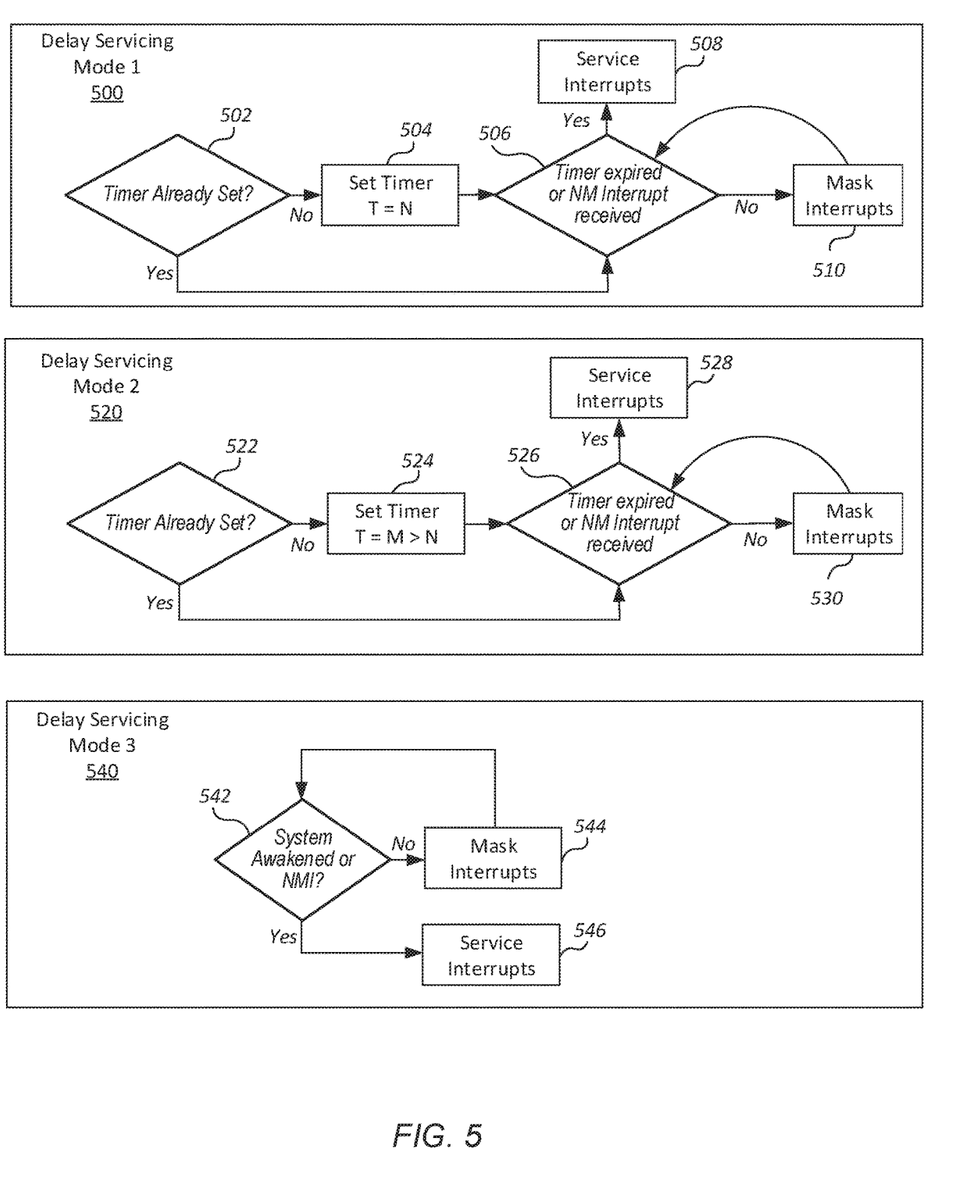
FIG. 5 illustrates embodiments for managing interrupts in a computing system.

FIG. 5 illustrates three embodiments of the delayed interrupt servicing modes discussed in FIG. 4. Illustrated are delay servicing Mode 1 (500), Mode 2 (520), and Mode 3 (540). Generally speaking, Mode 1 represents the highest power state of the three modes and Mode 3 represents the lowest power state of the three modes. As discussed in FIG. 4, an interrupt has been received and a delay servicing mode determined. In delay servicing mode 1 (500), a determination is made as to whether a delay timer (T) has already been set (502). For example, an interrupt can have been recently received which caused the timer to be set and the timer has not yet expired (i.e., the timer is active and is still in the process of recording the passage of time, such as via a decrement or otherwise). If the timer is not currently active, then the timer is set to a value N (504). In various embodiments, N can be an integer that represents a duration of time. For example, N can represent a number of clock cycles, microseconds, or some other measure of time. In addition to setting the timer, the masking of interrupts begins and servicing of the received interrupt is intentionally delayed. With the passage of time, a check of the timer value is performed to determine if it has expired (506). If it has not expired, masking of interrupts continues (510). On the other hand, when the timer expires, intentional delay of the servicing of the interrupt ceases and normal servicing of the interrupt is allowed to proceed (508). Alternatively, even if the timer has not expired (506), if a non-maskable (NM) interrupt is received, masking of the interrupts ceases and normal servicing of the interrupt is allowed to proceed (508). In other words, if an interrupt of type A was received and is currently being intentionally delayed (it is being masked), its intentional delay will be terminated if a non-maskable interrupt is received. In such a case, both the non-maskable interrupt and the interrupt that was being delayed will be serviced. In the present example, based on FIG. 4 and FIG. 5, interrupts of type A and B were deemed maskable. Therefore, if an interrupt of type C or D is received while in servicing mode 1 (500), then the received and currently delayed interrupt would be serviced (508). In other words, receipt of a non-maskable interrupt overrides the intentional delay of the maskable interrupt.

If in block 502 it is determined that the timer is currently active when the maskable interrupt is received, then the method foregoes setting the duration (i.e., skips block 504) and proceeds to block 506 where it waits for expiration of the timer or receipt of a non-maskable interrupt as described above. In such case, the intentional delay for the most recently received maskable interrupt will not be the full duration of N (assuming some time has already passed since the timer was set).

Servicing mode 2 (520) functions similar to that of servicing mode 1 (500), with the exception of which interrupts are deemed maskable and the duration of the intentional delay. As with servicing mode 1 (500), a determination is made as to whether the timer is already set and is active (522). If not, the timer is set to a value M wherein M is greater than N (524). In other words, the intentional delay for maskable interrupts in servicing mode 2 is longer than for servicing mode 1. The method then proceeds to block 526 where it waits for expiration of the timer or receipt of a non-maskable interrupt. When such an event occurs, servicing of the interrupts is allowed to proceed (528). If such an event has not yet occurred (526), masking of interrupts continues (530).

While in servicing mode 3 (540), interrupts are masked and their servicing is intentionally delayed until the system exits the current power state or a non-maskable interrupt is received (542). In this example, the current power state is a sleep state in which the processor is non-operational (i.e., is not currently powered to perform work). In this example, there is no timer used to stop the intentional delay of maskable interrupts. Consequently, servicing of maskable interrupts could be delayed for a significantly longer period of time than that of servicing mode 1 (500) or servicing mode 2 (520), assuming the system is not awakened and a non-maskable interrupt is not received. Assuming the system is not awakened and a non-maskable interrupt is not received, masking of interrupts continues (544). Otherwise, servicing of interrupts will be allowed to proceed (546).

While not illustrated in FIG. 5, in some embodiments a change in a power state of the system will change the current behavior of the masking of interrupts as illustrated. For example, if the current mode is delay servicing mode 2 (520) and the timer has not yet expired (526), masking of interrupts would ordinarily resume at expiration of the timer or receipt of a non-maskable interrupt—whichever occurs first. However, if the system transitions to a lower power state (e.g., S3) which corresponds to servicing mode 3 (540), then the condition for resuming servicing of maskable interrupts changes from that of block 526 to that of block 542. In other words, if the system transitions to power state S3 and then the timer expires, servicing of maskable interrupts does not resume. Rather, servicing of interrupts resumes upon the system being awakened or receipt of a non-maskable interrupt. Similarly, if the system transitions from power state S2 (corresponding to servicing mode 2) to power state 51 (corresponding to servicing mode 1), then any intentionally delayed interrupts that were maskable in servicing mode 2 that are not maskable in servicing mode 1 (e.g., an interrupt of type C) will cause the system to exit the intentional delay and service interrupts (508). These and other embodiments are possible and are contemplated.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors that execute program instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for coalescing interrupts, the system comprising:
a processor configured to service interrupts; and
an interrupt controller configured to:
determine the processor has transitioned from a full power state with no maskable interrupts to a first reduced power state of a plurality of reduced power states, each of the plurality of reduced power states having one or more maskable interrupts and one or more non-maskable interrupts;
detect a received interrupt; and
delay servicing of the interrupt in response to determining:
the interrupt corresponds to a first type of interrupt of a plurality of types of interrupts, wherein the first type of interrupt is one of the one or more maskable interrupts of the first reduced power state; and
the processor is in the first reduced power state.

2. The system as recited in claim 1, wherein at least two of the plurality of reduced power states have a different number of maskable interrupts.

3. The system as recited in claim 1, wherein in response to determining the processor is in the first reduced power state, the interrupt controller is further configured to set a masking duration equal to a first period of time during which servicing of maskable interrupts is delayed.

4. The system as recited in claim 3, wherein the interrupt controller is further configured to service any received interrupts that have had their servicing delayed, in response to detecting expiration of the first period of time.

5. The system as recited in claim 3, wherein the interrupt controller is further configured to service any received interrupts that have had their servicing delayed, in response to detecting receipt of a non-maskable interrupt.

6. The system as recited in claim 3, wherein in response to determining the processor is in a second power state lower than the first power state, the interrupt controller is further configured to set the masking duration equal to a second period of time during which servicing of interrupts is delayed, wherein the second period of time is greater than the first period of time.

7. The system as recited in claim 6, wherein in response to determining the processor is in a third power state lower than the second power state and with no associated masking duration, the interrupt controller is further configured to intentionally delay servicing of maskable interrupts until the system exits the third power state or a non-maskable interrupt is received.

8. The system as recited in claim 3, wherein in response to determining the reduced power state corresponds to the first power state and a timer is currently active, the interrupt controller is further configured to forego setting the masking duration.

9. A method for coalescing interrupts in a computing system, the method comprising:
generating, by a processing device, an interrupt for servicing by a processor;
determining, by an interrupt controller, the processor has transitioned from a full power state with no maskable interrupts to a first reduced power state of a plurality of reduced power states, each of the plurality of reduced power states having one or more maskable interrupts and one or more non-maskable interrupts;
detecting, by the interrupt controller, the interrupt; and
delaying, by the interrupt controller, servicing of the interrupt in response to determining:
the interrupt corresponds to a first type of interrupt of a plurality of types of interrupts, wherein the first type of interrupt is one of the one or more maskable interrupts of the first reduced power state; and
the processor is in the first reduced power state.

10. The method as recited in claim 9, wherein at least two of the plurality of reduced power states have a different number of maskable interrupts.

11. The method as recited in claim 9, wherein in response to determining the processor is in the first reduced power state, the method further comprises the interrupt controller setting a masking duration equal to a first period of time during which servicing of maskable interrupts is delayed.

12. The method as recited in claim 11, further comprising servicing any received interrupts that have had their servicing delayed, in response to detecting expiration of the first period of time.

13. The method as recited in claim 11, further comprising servicing any received interrupts that have had their servicing delayed, in response to detecting receipt of a non-maskable interrupt.

14. The method as recited in claim 11, wherein in response to determining the processor is in a second power state lower than the first power state, the method further comprises setting the masking duration equal to a second period of time during which servicing of interrupts is delayed, wherein the second period of time is greater than the first period of time.

15. The method as recited in claim 14, wherein in response to determining the processor is in a third power state lower than the second power state and with no associated masking duration, the method further comprises intentionally delaying servicing of maskable interrupts until the system exits the third power state or a non-maskable interrupt is received.

16. The method as recited in claim 11, wherein in response to determining the reduced power state corresponds to the first power state and a timer is currently active, the method further comprises foregoing setting the masking duration.

17. An apparatus, comprising:
a first interface configured to receive an indication of a current power state of a computing system;
a timer configured to measure a duration of time; and
logic comprising circuitry configured to:
determine a transition from a full power state with no maskable interrupts to a first reduced power state of a plurality of reduced power states, each of the plurality of reduced power states having one or more maskable interrupts and one or more non-maskable interrupts;
detect a type of a received interrupt; and
set the timer to a duration that corresponds to a delay for servicing of the interrupt in response to determining:
the interrupt corresponds to a first type of interrupt of a plurality of types of interrupts, wherein the first type of interrupt is one of the one or more maskable interrupts of the first reduced power state; and
the current power state is the first reduced power state.

18. The apparatus as recited in claim 17, wherein at least two of the plurality of reduced power states have a different number of maskable interrupts.

19. The apparatus as recited in claim 17, wherein in response to detecting the first reduced power state, the logic is further configured to set a masking duration equal to a first period of time during which servicing of maskable interrupts is delayed.

20. The apparatus as recited in claim 19, wherein the logic is further configured to service any received interrupts that have had their servicing delayed, in response to detecting expiration of the first period of time.

* * * * *